United States Patent [19]

Pfaendner et al.

[11] Patent Number: 5,693,681
[45] Date of Patent: Dec. 2, 1997

[54] INCREASING THE MOLECULAR WEIGHT OF POLYESTERS

[75] Inventors: Rudolf Pfaendner, Rimbach/Odenwald; Heinz Herbst, Lautertal-Reichenbach; Kurt Hoffmann, Lautertal, all of Germany

[73] Assignee: Ciba Specialty Chemicals Corporation, Tarrytown, N.Y.

[21] Appl. No.: 700,537

[22] PCT Filed: Feb. 15, 1995

[86] PCT No.: PCT/EP95/00541

§ 371 Date: Aug. 28, 1996

§ 102(e) Date: Aug. 28, 1996

[87] PCT Pub. No.: WO95/23176

PCT Pub. Date: Aug. 31, 1995

[30] Foreign Application Priority Data

Feb. 28, 1994 [CH] Switzerland ................ 578/94

[51] Int. Cl.⁶ .................................................. C08J 11/04
[52] U.S. Cl. .................... 521/48; 525/437; 525/439; 524/115; 524/123; 524/174; 524/323
[58] Field of Search .................. 525/437, 439; 524/115, 123, 174, 323; 521/43.5, 48

[56] References Cited

U.S. PATENT DOCUMENTS

| | | |
|---|---|---|
| 3,281,505 | 10/1966 | Spivack .................. 558/194 |
| 3,310,575 | 3/1967 | Spivack ................... 556/19 |
| 3,901,848 | 8/1975 | Dibattista et al. ........... 524/91 |
| 4,277,391 | 7/1981 | Charles ................. 524/114 |
| 4,485,196 | 11/1984 | Speranza et al. .......... 521/172 |
| 4,778,840 | 10/1988 | Linhart et al. ............ 524/131 |
| 5,225,130 | 7/1993 | Deiringer ................ 264/102 |
| 5,334,669 | 8/1994 | Ghisolfi ................. 525/437 |
| 5,434,238 | 7/1995 | White et al. ............. 528/272 |
| 5,480,962 | 1/1996 | White et al. ............. 528/272 |
| 5,543,488 | 8/1996 | Miller et al. ............. 528/277 |

FOREIGN PATENT DOCUMENTS 4034459  5/1992  Germany.

OTHER PUBLICATIONS

Kunststoffe 74, (1984), pp. 218–221.

Kunststoffe 82, (1992), pp. 284–288.

*Primary Examiner*—Samuel A. Acquah
*Attorney, Agent, or Firm*—David R. Crichton; Victoria M. Malia

[57] ABSTRACT

A process is disclosed for increasing the molecular weight of polyesters, polyester copolymers or polyester blends, which comprises heating a polyester blended with a tetracarboxylic acid dianhydride and a sterically hindered hydroxyphenylalkylphosphonic acid ester or half-ester to above the melting point (glass transition temperature) of the polyester.

11 Claims, No Drawings

INCREASING THE MOLECULAR WEIGHT OF POLYESTERS

This application is a 371 of PCT/EP95/00541 filed Dec. 15, 1995.

The present invention relates to a process for increasing the molecular weight of polyesters and to the polyesters obtainable by said process.

Polyesters as exemplified by polyethylene terephthalate (PET) and polybutylene terephthalate (PBT), as well as polyester copolymers and polyester blends with e.g. polycarbonate (PBT/PC), are important thermoplastics belonging to the group of engineering plastics. Partially crystalline polyesters are used for injection moulding compounds and have superior strength and rigidity, high dimensional stability and good wear properties. Amorphous polyesters have high transparency, superior toughness and very good resistance to stress-cracking, and can be processed to hollow objects. A further utility of PET is fibre production.

The mechanical and physical properties depend essentially on the molecular weight of the polymer. Owing to reduced molecular weight, it is only possible to achieve a limited high-quality recycling of used polyesters and production waste without carrying out an aftertreatment.

It is generally known to enhance the material properties of used polyesters, i.e. polyesters damaged by heat or hydrolysis, which damage is typically accompanied by a molecular weight reduction. As polycondensates, polyesters are obtained by a postcondensation in the solid state (S. Fakirov, Kunststoffe 74 (1984), 218 and R. E. Grützner, A. Koine, Kunststoffe 82 (1992), 284). However, this method is troublesome and, moreover, is highly sensitive to the impurities that may be present in waste material. A typical method of regenerating waste PET is disclosed in DE 40 34 459. To increase the melt viscosity in this method a residence time of up to 4 hours under vacuum in the temperature range from 270° to 310° C. is necessary.

It is therefore the object of this invention to provide a process that makes it possible to increase the molecular weight of polyesters, especially PET, in a relatively short time.

Surprisingly, it has been found possible to increase the molecular weight of polyesters substantially by fusing the polyester and blending it with a mixture of at least one tetracarboxylic dianhydride and a sterically hindered hydroxyphenylalkylphosphonic acid ester or half-ester. This molecular weight increase effects an enhancement of the properties of the polyesters, preferably of those used for injection moulding and of recyclates, especially PET bottle scrap material.

Accordingly, the invention relates to a process for increasing the molecular weight of polyesters, polyester copolymers or polyester blends, which comprises heating a polyester blended with a tetracarboxylic dianhydride and a sterically hindered hydroxyphenylalkylphosphonic acid ester or half-ester to above the melting point (in the case of crystalline polyesters) or to above the glass transition temperature (in the case of amorphous polyesters) of said polyester.

The polyesters, i.e. virgin polyesters as well as polyester recyclate, may be homo- or copolyesters that are derived from aliphatic, cycloaliphatic or aromatic dicarboxylic acids and diols or hydroxycarboxylic acids. In addition, mixtures of these polyesters are also suitable. Their composition will depend essentially on the desired properties for a specific end use.

The aliphatic dicarboxylic acids may contain from to 2 to 40 carbon atoms, the cycloaliphatic dicarboxylic acids from 6 to 10 carbon atoms, the aromatic dicarboxylic acids from 8 to 14 carbon atoms, the aliphatic hydrocarboxylic acids from 2 to 12 carbon atoms and the aromatic and cycloaliphatic hydroxycarboxylic acids from 7 to 14 carbon atoms.

The aliphatic diols may contain from 2 to 12 carbon atoms, the cycloaliphatic diols from 5 to 8 carbon atoms and the aromatic diols from 6 to 16 carbon atoms.

Aromatic diols will be understood as meaning those in which two hydroxyl groups are bonded to one or to different aromatic hydrocarbon radicals.

The polyesters may also be branched with minor amounts, typically 0.1 to 3 mol %, based on the dicarboxylic acids, of more than difunctional monomers (e.g. pentaerythritol, trimellitic acid, 1,3,5-tris(hydroxyphenyl) benzene, 2,4-dihydroxybenzoic acid or 2-(4-hydroxyphenyl)-2-(2,4-dihydroxyphenyl)propane).

If the polyesters are based on at least two monomers, said monomers can be randomly distributed, or they may be block polymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, typically suberonic acid, oxalic acid, malonic acid, dimethylmalonic acid, succinic acid, octadecylsuccinic acid, pimelic acid, adipic acid, trimethyladipic acid, sebacic acid, azelaic acid and dimer acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: preferably terephthalic acid, isophthalic acid, o-phthalic acid, as well as 1,3- , 1,4-, 2,6- or 2,7-naphthalenedicarboxylic acid, 4,4'-diphenyldicarboxylic acid, 4,4'-diphenylsulfonecarboxylic acid, 1,1,3-trimethyl-5-carboxy-3-(p-carboxyphenyl) indane, 4,4'-diphenyl ether dicarboxylic acid, bis-p-(carboxyphenyl)methane, 4,4'-benzophenonedicarboxylic acid, bis-(p-carboxyphenyl)ethane).

The aromatic dicarboxylic acids are preferred, including in particular terephthalic acid and isophthalic acid.

Further suitable dicarboxylic acids are those that contain —CO—NH— groups and which are disclosed in DE-OS 2 414 349. Dicarboxylic acids that contain N-heterocyclic rings are also suitable, for example those that are derived from carboxyalkylated, carboxyphenylated or carboxybenzylated monoamine-s-triazinedicarboxylic acids (q.v. DE-OS 2 121 184 and 2 533 675), mono- or bishydantoins, benzimidazolenes or halogenated benzimidazolenes or parabanic acid. The carboxyalkyl groups in these compounds may contain from 3 to 20 carbon atoms.

Suitable aliphatic diols are the linear and branched aliphatic glycols, preferably those containing 2 to 12, most preferably 2 to 6, carbon atoms in the molecule, typically including: ethylene glycol, 1,2- and 1,3-propylene glycol, 1,2-, 1,3-, 2,3- or 1,4-butanediol, pentyl glycol; neopentyl glycol, 1,6-hexanediol, 1,12-dodecanediol. A suitable cycloaliphatic diol is typically 1,4-dihydroxycyclohexane in cis- or trans-form or as cis/trans mixture. Further suitable aliphatic diols are typically 1,4-bis(hydroxymethyl) cyclohexane, aromatic-aliphatic diols such as p-xylylene glycol or 2,5-dichloro-p-xylylene glycol, 2,2-(β-hydroxyethoxyphenyl)propane, as well as polyoxyalkylene glycols such as diethylene glycol, triethylene glycol or polyethylene glycol. The alkylene diols are preferably linear and preferably contain 2 to 4 carbon atoms.

Preferred diols are the alkylene diols, 1,4-dihydroxycyclohexane and 1,4-bis(hydroxymethyl) cyclohexane. Ethylene glycol and 1,4-butanediol are especially preferred.

Further suitable aliphatic diols are the β-hydroxyalkylated, preferably β-hydroxyethylated, bisphenols as exemplified by 2,2-bis[4'-(β-hydroxyethoxy)phenyl] propane. Further bisphenols are mentioned hereinafter.

A further group of suitable aliphatic diols comprises the heterocyclic diols disclosed in German Offenlegungsschrift specifications 1 812 003, 2 342 432, 2 342 372 and 2 453 326 Illustrative examples are: N,N'-bis(β-hydroxyethyl-5,5-dimethyl)hydantoin, N,N'-bis(β-hydroxypropyl-5,5-dimethyl)hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethylbenzylimidazolone, -(tetrachloro) benzimidazolone or -(tetrabromo)benzimidazolone.

Suitable aromatic diols are mononuclear diphenols and, preferably, dinuclear diphenols which carry a hydroxyl group at each aromatic nucleus. Aromatic will be understood as meaning preferably aromatic hydrocarbon radicals such as phenylene or naphthylene. In addition to e.g. hydroquinone, those bisphenols that may be illustrated by the following formulae merit special mention:

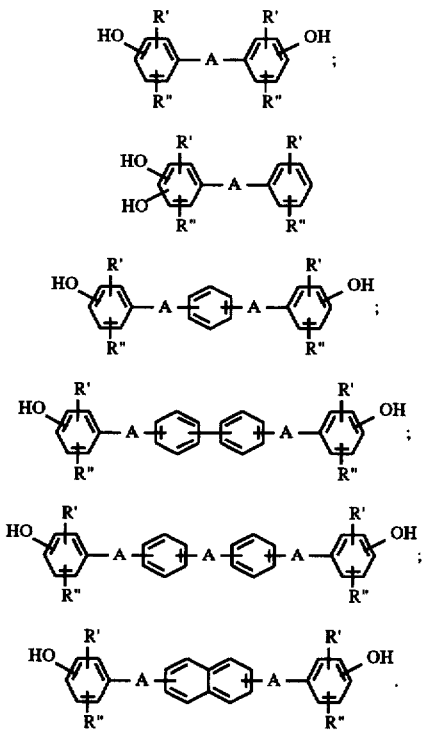

The hydroxyl groups may be in m-position, but are preferably in p-position. R' and R" in this formula may be alkyl of 1 to 6 carbon atoms, halogen such as chloro or bromo and, preferably, hydrogen atoms. A may be a direct bond or —O—, —S—, —SO$_2$—, —CO—, >P(O) (C$_1$–C$_{20}$alkyl), unsubstituted or substituted alkylidene, cycloalkylidene or alkylene.

Unsubstituted or substituted alkylidene is exemplified by: ethylidene, 1,1- or 2,2-propylidene, 2,2-butylidene, 1,1-isobutylidene, pentylidene, hexylidene, heptylidene, octylidene, dichloroethylidene, trichloroethylidene.

Illustrative examples of unsubstituted or substituted alkylene are methylene, ethylene, phenylmethylene, diphenylmethylene, methylphenylmethylene. Illustrative examples of cycloalkylidene are cyclopentylidene, cyclohexylidene, cycloheptylidene and cyclooctylidene.

Illustrative examples of bisphenols are: bis(p-hydroxyphenyl) ether or thioether, bis(p-hydroxyphenyl) sulfone, bis(p-hydroxyphenyl)methane, bis(4-hydroxyphenyl)-2,2'-biphenyl, phenylhydroquinone, 1,2-bis (p-hydroxyphenyl)ethane, 1-phenyl-bis(p-hydroxyphenyl) methane, diphenyl bis(p-hydroxyphenyl)methane, diphenyl bis(p-hydroxyphenyl)ethane, diphenyl bis(p-hydroxyphenyl)methane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis (3',5'-dimethyl-4'-hydroxyphenyl)propane, 1,1- or 2,2-bis(p-hydroxyphenyl) butane, 2,2-bis(p-hydroxyphenyl)hexafluoropropane, 1,1-dichloro- or 1,1,1-trichloro-2,2-bis(p-hydroxyphenyl) ethane, 1,1-bis(p-hydroxyphenyl)cyclopentane and, preferably, 2,2-bis(p-hydroxyphenyl)propane (bisphenol A) and 1,1-bis(p-hydroxyphenyl)cyclohexane (bisphenol C).

Suitable polyesters of hydroxycarboxylic acids typically include polycaprolactone, polypivalolactone or the polyesters of 4-hydroxycyclohexanecarboxylic acid or 4-hydroxybenzoic acid, 5-hydroxynaphthalene-1-carboxylic acid, 6-hydroxynaphthalene-1-carboxylic acid.

Polyesters with aromatic dicarboxylic acids have achieved the greatest importance, in particular the polyalkylene terephthalates. Inventive moulding materials are therefore preferred in which the polyester is comprised of at least 30 mol %, preferably of at least 40 mol %, of aromatic dicarboxylic acids, and of at least 30 mol %, preferably of at least 40 mol %, of alkylenediols containing preferably 2 to 12 carbon atoms, based on the polyester.

Especially in this case the alkylenediol is linear and contains 2 to 6 carbon atoms and is exemplified by ethylene, trimethylene, tetramethylene or hexamethylene glycol and the aromatic dicarboxylic acid is terephthalic and/or isophthalic acid.

Particularly suitable polyesters are PET, PBT and corresponding copolymers and blends, as exemplified by PBT/PC, PBT/ASA, PBT/ABS, PET/ABS, PET/PC or also PBT/PET/PC or PBT/PC/ABS, which preponderantly contain the indicated polyesters.

The most preferred polyester is the amorphous PET used for the manufacture of blow-moulded bottles. A further preferred form comprises the polyester recyclates originating from domestic and industrial waste or from useful material collections, from production waste or from obligatory returnables. As regards the chemical composition of the polyester recyclates, the particulars given above apply likewise. PET and PBT recyclates are in this case also preferred. Polyester recyclates consist primarily of PET hollow objects, especially PET bottle materials of different provenance and having a varying degree of damage. The PET bottle materials originating from different manufacturers comprise polyethylene terephthalate and also copolymers of different structure and composition, but with a preponderant content of PET structures. The recyclates may also contain minor amounts of other polymers, including polyolefins or PVC.

These recyclates may furthermore contain standard impurities such as dye residues, paint residues, metal traces, fuel residues or inorganic salts.

Tetracarboxylic dianhydrides useful within the scope of this invention are those of formula

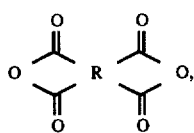

wherein R is $C_4$–$C_{20}$ alkanetetrayl or a radical of formulae (Va)–(Vj)

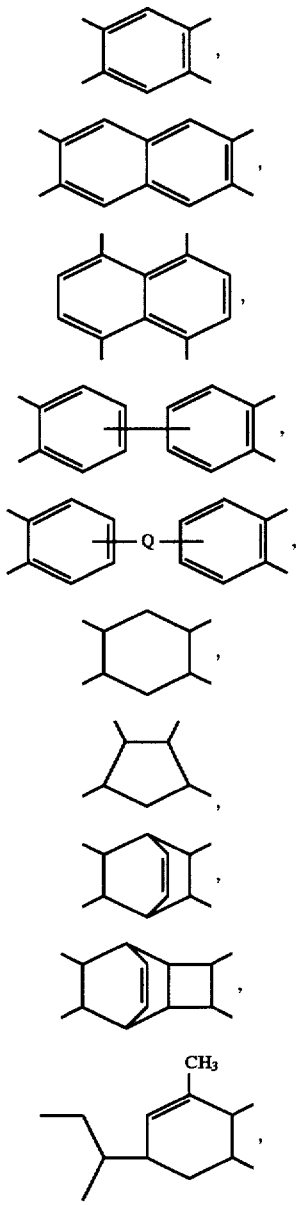

wherein Q is —$CH_2$—, —$CH(CH_3)$—, —$C(CH_3)_2$—, —$C(CF_3)_2$—, —S—, —O—, —$SO_2$—, —NHCO—, —CO— or >P(O)($C_1$–$C_{20}$alkyl), and wherein the aromatic rings in the formulae and (Va)–(Ve) are unsubstituted or substituted by one or more $C_1$–$C_6$alkyl groups, $C_1$–$C_6$alkoxy groups or halogen atoms.

In case of R being an alkanetetrayl radical, the tetracarboxylic dianhydride may be such as butane-1,2,3,4-tetracarboxylic dianhydride.

Preferred tetracarboxylic dianhydrides are those containing aromatic rings.

Particularly preferred tetracarboxylic dianhydrides are pyromellitic dianhydride, 3,3',4,4'-benzophenonetetracarboxylic dianhydride, 3,3',4,4'-biphenyltetracarboxylic dianhydride and oxydiphthalic dianhydride.

A mixture of tetracarboxylic dianhydrides of different structure may also be used.

Sterically hindered hydroxyphenylalkylphosphonic acid esters and half-esters are disclosed, inter alia, in U.S. Pat. No. 4,778,840, and may be illustrated by the following formula:

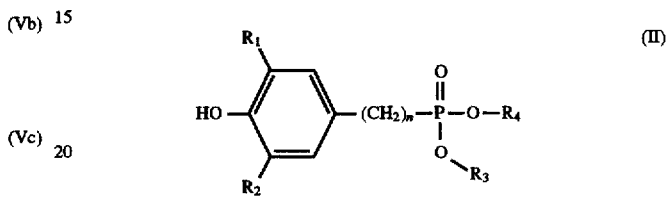

wherein $R_1$ is isopropyl, tert-butyl, cyclohexyl or cyclohexyl which is substituted by 1 to 3 $C_1$–$C_4$alkyl groups;

$R_2$ is H, $C_1$–$C_4$alkyl, cyclohexyl or cyclohexyl which substituted by 1 to 3 $C_1$–$C_4$alkyl groups;

$R_3$ is $C_1$–$C_{20}$alkyl or substituted or unsubstituted phenyl or naphthyl;

$R_4$ is H, $M^{2+}/2$, $C_1$–$C_{20}$alkyl or substituted or unsubstituted phenyl or naphthyl;

$M^{2+}$ is a divalent metal cation, and n is 1 to 6.

Substituents defined as alkyl containing up to 20 carbon atoms may suitably be methyl, ethyl, propyl, butyl, pentyl, hexyl and octyl, stearyl, as well as corresponding branched isomers. $C_2$–$C_4$Alkyl is preferred.

Suitable substituents of the phenyl or naphthyl radicals are typically $C_1$–$C_4$alkyl groups.

Suitable divalent metal cations are Zn, Ba, Ca, Mg and Mn. Ca is particularly preferred.

Preferred compounds of formula (II) are those that contain at least one tert-butyl group as $R_1$ or $R_2$. Compounds in which $R_1$ and $R_2$ are tert-butyl are very particularly preferred.

Preferably n is 1 or 2 and, most preferably, 1.

Very particularly preferred sterically hindered hydroxyphenylalkylphosphonic acid esters and half-esters are

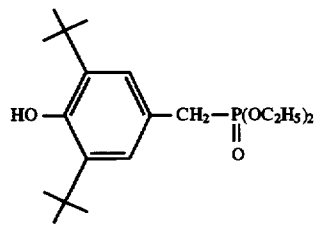

and

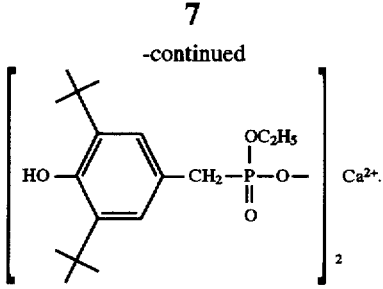

The process can be carried out in any heatable apparatus fitted with a stirrer. It is preferred to carry out the process in closed apparatus excluding atmospheric oxygen, conveniently in an inert gas atmosphere ($N_2$). The process may, however, also be carried out in an extruder and also in the presence of air.

The polyester material to be heated and the mixture of tetracarboxylic dianhydride and sterically hindered hydroxyphenylalkylphosphonic acid ester and half-ester are usually charged to the apparatus at the start of heating; but a subsequent addition of tetracarboxylic dianhydride/phenol mixture to the polyester is also possible, in which case the mixture itself may be added or else the single components may be added in any order. For the addition, the tetracarboxylic dianhydride and the phenol can independently of each other be in the form of a powder, liquid, granulate or in compacted form, or also in some cases on a substrate such as silica gel or together with a polymer powder or wax such as a polyethylene wax. A mixture with polyethylene wax is a preferred form of addition, especially when using the metal salts of the phenol.

Heating to above the melting point or glass transition temperature is normally carried out with stirring until the tetracarboxylic dianhydride/phenol mixture is homogenised. The temperature will depend on the polyester used. In the case of crystalline polyesters it is preferred to carry out the process in the range from the melt temperature to about 50° C. above the melt temperature. In the case of amorphous polyesters, the process is carried out in the range from c. 50° C. to 150° C. above the respective glass transition temperature.

Usually from 0.01 part to 5 parts, preferably from 0.05 to 2 parts and, most preferably, 0.1 to 1 part, of tetracarboxylic anhydride, and 0.01 part to 5 parts, preferably 0.02 to 1 part and, most preferably, 0.05 to 0.5 part, of a sterically hindered hydroxyphenylalkylphosphonic acid ester or half-ester, are added per 100 parts of polyester. The amount of tetracarboxylic anhydride and sterically hindered hydroxyphenylalkylphosphonic acid ester or half-ester will depend on the initial molecular weight of the polymer and on the desired final molecular weight. Thus, when using a severely damaged polyester, i.e. one having a low molecular weight, it is preferred to use tetracarboxylic anhydride and phenol in the upper weight region. But if only a low increase in molecular weight is desired, then it is preferred to use a tetracarboxylic anhydride and a phenol in low concentration.

In addition to the mixture of a tetracarboxylic anhydride and a sterically hindered hydroxyphenylalkylphosphonic acid ester or half-ester, it it also possible to add co-stabilisers to the polyester. Those skilled in the art will be familiar with these co-stabilisers, which will be chosen in accordance with the specific requirement made of the final product. In particular, light stabilisers or also antioxidants can be added ("Plastics Additives Handbook", Ed. R. Gächter and H. M üller, Hanser Verlag, 3rd ed. 1990; in particular pages 92/94 und 258/259). It is also possible to add further modifiers, typically including slip agents, mould release agents, fillers or reinforcing agents such as glass fibres, flame retardants, antistatic agents and, especially for PBT/PC recyclates, modifiers that prevent transesterification during processing.

Particularly suitable co-stabilisers include:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Chromane derivatives of formula

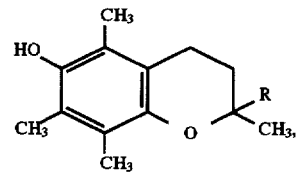

wherein R is

—$(CH_2)_3$—$CH(CH_3)$—$(CH_2)_3$—$CH(CH_3)$—$(CH_2)_3$—CH—$(CH_3)_2$ or —$CH_2$—$CH_2$—O—C(O)—Z and Z is $C_1$–$C_{18}$alkyl, —$CH_2$—$CH_2$—S—$C_1$–$C_{18}$alkyl or

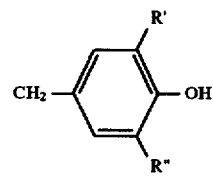

and R' or R" is hydrogen, methyl or tert-butyl, e.g. α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'- ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3, 5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, bis[octadecyl-2-(3-tert-butyl-4-hydroxy-5-methylbenzyl)]malonate, bis[dodecylmercaptoethyl-2,2-bis-(3,5-di-tert-butyl-4-hydroxybenzyl)]malonate, bis[4-(1, 1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3, 5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

Among these compounds, preferred antioxidants are:

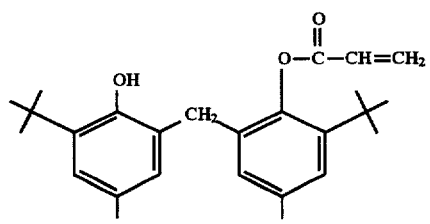

{2-(1,1-dimethylethyl)-6-[[3-(1,1-dimethylethyl)-2-hydroxy-5-methylphenyl]-methyl]-4-methylphenyl 2-propenoate};

-continued

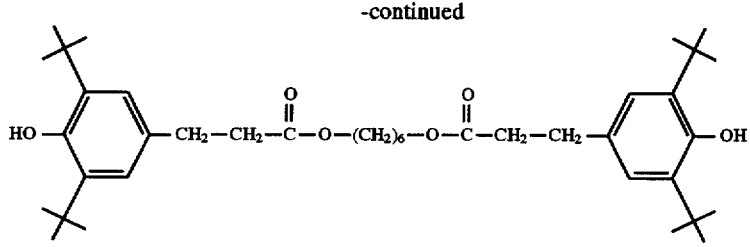

{1,6-hexanediyl 3,5-bis(1,1-dimethylethyl)-4-hydroxyphenylpropanoate};

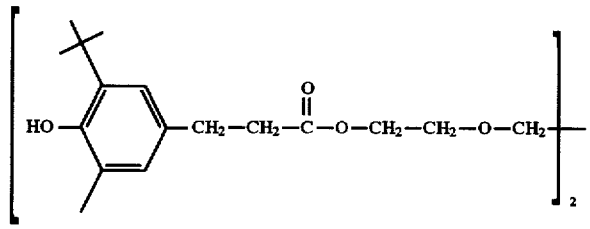

{1,2-ethandiylbis(oxy-2,1-ethanediyl) 3-(1,1-dimethylethyl)-4-hydroxy-5-methylphenyl-propoanoate};

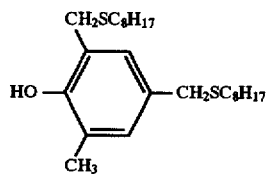

{2-methyl-4,6-bis[(octylthio)methyl]phenol};

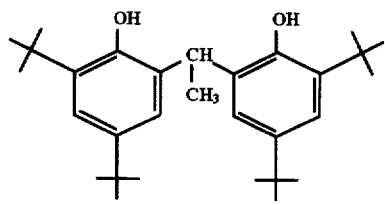

{2,2'-ethylidenebis(4,6-di-tert-butylphenol)};

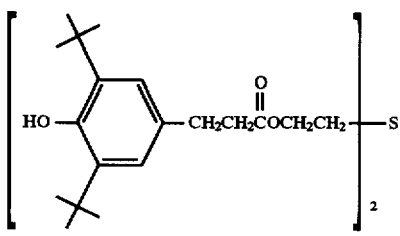

{thiodi-2,1-ethanediyl 3,5-bis(1,1-dimethylethyl)-4-hydroxyphenylpropanoate};

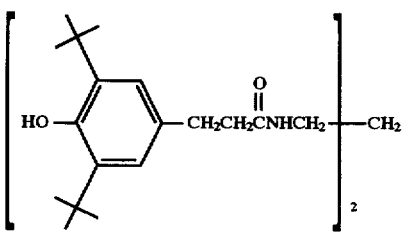

{3,5-bis(1,1-dimethylethyl)-4-hydroxyphenylpropanoic acid methylenedimethylene amide};

-continued

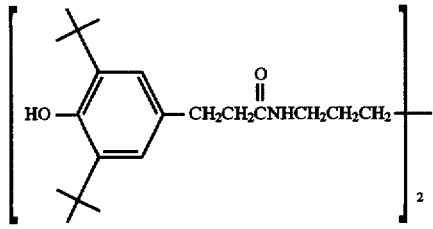

{3,5-bis(1,1-dimethylethyl)-4-hydroxyphenylpropanoic acid di-1,3-propanediylamide};

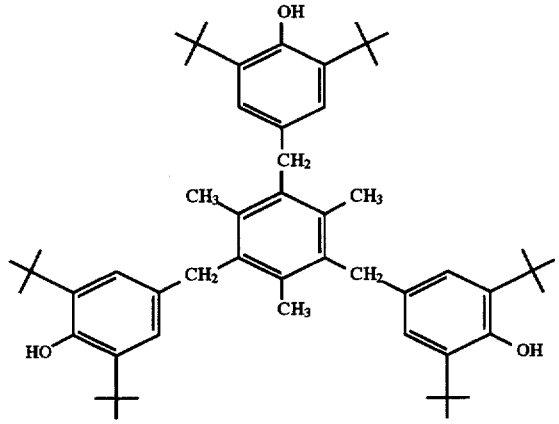

{4,4',4"-[(2,4,6-trimethyl-1,3,5-phenyltriyl)tris-(methylene)]tris[2,6-bis(1,1-dimethylethyl)phenol]};

and the pentaerythrityl, octyl and octadecyl ester of β-(3,5-di-tert-butyl-4-hydroxyphenyl)propionic acid 2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH₂CH₂—COO(CH₂)₃$]_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2, 4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4, 6-tris(tert-butylphenyl)pentaerythritol diphsophite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1, 3,2-dioxaphosphocin, bis(2,4-di-tert-butyl-6-methylphenyl) methylphosphite, bis(2,4-di-tert-butyl-6-methylphenyl) ethylphosphite.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

8. Nucleating agents, for example, 4-tert-butylbenzoic acid, adipic acid, diphenylacetic acid or sodium or aluminum benzoates.

9. Fillers and reinforcing agents, for example, calcium carbonate, silicates, glass fibres, talc, kaolin, mica, barium sulfate, metal oxides and hydroxides, carbon black, graphite.

10. Other additives, for example, plasticisers, lubricants, emulsifiers, pigments, optical brighteners, flameproofing agents, antistatic agents and blowing agents, for mixtures of recyclates in particular co-compatibilisers, typically copolymers, preferably block copolymers, of styrene with butadiene and optionally acrylonitrile. The co-compatibilisers may be copolymers of ethylene and propylene and a third optional monomer component, e.g. butadiene. Chlorinated polyethylene or ethylenevinyl acetate copolymers are also suitable co-compatibilisers, although it naturally depends on the particular composition of the recyclate. Other suitable co-compatibilisers contain in particular polar groups, for example maleic anhydride-styrene copolymers or graft polymers containing acrylic acid groups. The polymeric co-compatibilisers are usually added in amounts of 2–20% by weight, based on the plastic material to be stabilised.

11. Benzofuranones and indolinones, for example those disclosed in U.S. Pat. No. 4,325,863, U.S. Pat. No. 4,338, 244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butylbenzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3, 5-dimethylphenyl)-5,7-di-tert-butyl-benzofuran-2-one, 3-(3, 5-dimethyl-4-pivaloyloxyphenyl)-5,7-di-tert-butyl-benzofuran-2-one.

Preferred light stabilisers are those of classes 2.1, 2.6 and 2.7, including light stabilisers of the Chimassorb 944, Chimassorb 119, Tinuvin 234, Tinuvin 312 or Tinuvin 770 type. Other preferred light stabilisers are aromatic phosphites or phosphonites.

The invention further relates to the use of a mixture comprising a tetracarboxylic dianhydride and a sterically hindered hydroxyphenylalkylphosphonic acid ester or half-ester for increasing the molecular weight of polyesters and, in particular of polyester recyclates. The preferred utilities are the same as those referred to in connection with the process.

The invention also relates to polyesters, polyester copolymers or polyester blends and polyester recyclates comprising a tetracarboxylic dianhydride and a sterically hindered hydroxyphenylalkylphosphonic acid ester or half-ester. The preferences in connection with said polyesters are the same as those referred to in connection with the process.

The invention is illustrated by the following non-limitative Examples in which and in the remainder of the description, unless otherwise stated, parts and percentages are by weight and

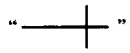

represents a tert-butyl radical (in analogy for other radicals).

EXAMPLES 1–4

In a glass tube fitted with stirrer, a polyester granulate (Melinar® B30 S, ICI) is heated with the components under a stream of nitrogen in an oil bath heated to 280° C. After 10 minutes the polymer mixture is sufficiently fused to be stirrable. The mixture is stirred for 20 minutes and then removed from the glass tube. The intrinsic viscosity [η] is determined by measuring a solution of 1 g of the polymer in 100 g of o-dichlorobenzene/phenol (1:1) at 30° C. The amounts and the results obtained are set forth in Table 1.

TABLE 1

Increase in molecular weight of polyester (PES)

| Example | Parts of tetracarboxylic dianhydride (per 100 parts PES) | Parts of hindered phenol (per 100 parts PES) | Int. visc.* (dl/g) |
|---|---|---|---|
| A | — | — | 0.56 |
| B | 1 PMDA | — | 0.82 |
| C | 0.5 OPDA | — | 0.76 |
| 1 | 0.5 PMDA | 0.25 Irganox 1425 | 1.40 |
| 2 | 0.5 BTDA | 0.25 Irganox 1425 | 1.01 |
| 3 | 0.5 BPDA | 0.25 Irganox 1222 | 0.90 |
| 4 | 0.5 OPDA | 0.25 Irganox 1222 | 0.89 |

*intrinsic viscosity [η]: $\lim_{c \to 0} \eta_{red.} = \lim_{c \to 0} [(\eta_{rel.} - 1)1/c]$ Table 1 relating to Examples 1–4 of this invention (addition of tetracarboxylic dianhydride and hydroxyphenylalkylphosphonic acid ester or half-ester) shows a marked increase in intrinsic viscosity, thereby indicating an increase in molecular weight.

EXAMPLES 5–8

A polyester (Eastman Kodapak 7352®) is kneaded over a period of 30 minutes at 46 rpm in an oil-heated mixing chamber (Brabender). The polyester is then removed and the intrinsic viscosity [η] is determined by measuring a solution of 1 g of the polymer in 100 g of o-dichlorobenzene/phenol (1:1) at 30° C. The amounts and the results obtained are set forth in Table 2.

TABLE 2

Increase in molecular weight of polyester (PES)

| Example | Parts of tetracarboxylic dianhydride (per 100 parts PES) | Parts of hindered phenol (per 100 parts PES) | Int. visc.* (dl/g) |
|---|---|---|---|
| D | — | — | 0.40 |
| E | 0.5 PMDA | — | 0.46 |
| F | 0.5 BTDA | — | 0.48 |
| G | — | 0.5 Irganox 1425 | 0.53 |
| 5 | 0.25 PMDA | 0.25 Irganox 1425 | 0.64 |
| 6 | 0.25 BTDA | 0.25 Irganox 1425 | 0.58 |
| 7 | 0.5 PMDA | 0.25 Irganox 1425 | 0.73 |
| 8 | 0.5 BTDA | 0.25 Irganox 1425 | 0.62 |

*intrinsic viscosity [η]: $\lim_{c \to 0} \eta_{red.} = \lim_{c \to 0} [(\eta_{rel.} - 1)1/c]$ Table 2 relating to Examples 5–8 of this invention (addition of tetracarboxylic dianhydride and hydroxyphenylalkylphosphonic acid ester or half-ester) shows a marked increase in intrinsic viscosity, thereby indicating an increase in molecular weight.

EXAMPLES 9–11

The procedure of Examples 5–8 is repeated, but kneading the individual samples for 15 minutes. The amounts and the results obtained are set forth in Table 3.

TABLE 3

Increase in molecular weight of polyester (PES)

| Ex. | Material | Parts of tetracarboxylic dianhydride (per 100 parts PES) | Parts of hindered phenol (per 100 parts PES) | Int. visc.* (dl/g) |
|---|---|---|---|---|
| H | ** | — | — | 0.52 |
| 9 | ** | 0.5 PMDA | 0.25 Irganox 1425 | 0.88 |
| J | *** | — | — | 0.59 |
| 10 | *** | 0.5 PMDA | 0.25 Irganox 1425 | 0.88 |
| 11 | *** | 0.5 PMDA | 0.25 Irganox 1222 | 0.94 |

*intrinsic viscosity [η]: $\lim_{c \to 0} \eta_{red.} = \lim_{c \to 0} [(\eta_{rel.} - 1)1/c]$
**Kodapak 7352
***PET recyclate from bottle scrap collection (ex NL)

Table 3 relating to Examples 9–11 of this invention (addition of tetracarboxylic dianhydride and hydroxyphenylalkylphosphonic acid ester or half-ester) shows a marked increase in intrinsic viscosity, thereby indicating an increase in molecular weight.

EXAMPLES 12–17

The procedure of Examples 9–11 is repeated. The amounts and the results obtained are set forth in Table 4.

TABLE 4

Increase in molecular weight of polyester (PES)

| Ex. | Material | Parts of tetracarboxylic dianhydride (per 100 parts PES) | Parts of hindered phenol (per 100 parts PES) | Int. visc.* (dl/g) |
|---|---|---|---|---|
| 12 | Kodapak 7352 | 0.5 PMDA | 0.25 Irganox 1222 | 0.84 |
| 13 | Kodapak 7352 | 0.25 PMDA | 0.10 Irganox 1425 | 0.72 |
| 14 | Kodapak 7352 | 0.25 PMDA | 0.25 Irganox 1425 | 0.74 |

TABLE 4-continued

Increase in molecular weight of polyester (PES)

| Ex. | Material | Parts of tetracarboxylic dianhydride (per 100 parts PES) | Parts of hindered phenol (per 100 parts PES) | Int. visc.* (dl/g) |
|---|---|---|---|---|
| comparison | bottle mat. ex CH | — | — | 0.49 |
| 15 | bottle mat. ex CH | 0.50 PMDA | 0.50 Irganox 1425 WL | 0.87 |
| 16 | bottle mat. ex CH | 0.50 PMDA | 0.25 Irganox 1425 | 0.82 |
| 17 | bottle mat. ex CH | 1.00 PMDA | 0.25 Irganox 1425WL | 1.04 |

*intrinsic viscosity $[\eta]$: $\lim_{c \to 0} \eta_{red.} = \lim_{c \to 0} [(\eta_{rel.} - 1)1/c]$

EXAMPLE 18

PET waste material from a bottle scrap collection (ex CH) together with 0.5% of PMDA and 0.25% of Irganox 1425 WL is extruded at a maximum temperature of 270° C. on a Haake Rheocord 90/TW 100 conical twin-screw extruder. The solution viscosity of the granulate so obtained is 0.83 dl/g. Without the additives of this invention, The solution viscosity is 0.46 dl/g.

The compounds used in the Examples are:

BPDA: 3,3',4,4'-biphenyltetracarboxylic dianhydride
BTDA: 3,3',4,4'-benzophenonetetracarboxylic dianhydride
OPDA: oxybisphenyl-3,4-dicarboxylic anhydride
PMDA: pyromellitic dianhydride

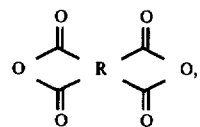

Irganox® 1222

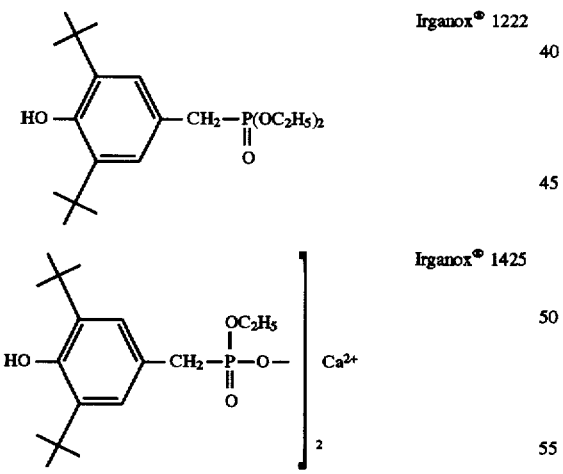

Irganox® 1425

Irganox® 1425 WL: 1:1 mixture of Irganox® 1425 and polyethylene wax.

What is claimed is:

1. A process for increasing the molecular weight of polyesters, polyester copolymers or polyester blends, which comprises heating a polyester blended with a tetracarboxylic acid dianhydride and a sterically hindered hydroxyphenylalkylphosphonic acid ester or half-ester to above the melting point (in the case of crystalline polyesters) or to above the glass transition temperature (in the case of amorphous polyesters) of the polyester.

2. A process according to claim 1, wherein the polyesters, polyester copolymers or polyester blends are polyester recyclates recovered from domestic waste, industrial waste or useful material collections, production waste or obligatory returnables.

3. A process according to claim 1, wherein the tetracarboxylic dianhydride has the formula

wherein R is $C_4$–$C_{20}$alkanetetrayl or a radical of formulae (Va)–(Vj)

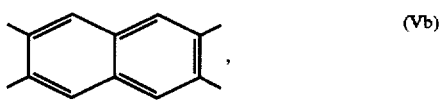
(Va)

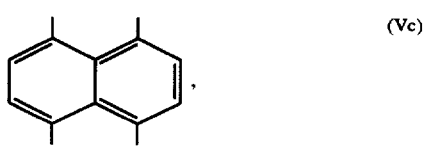
(Vb)

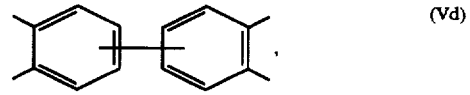
(Vc)

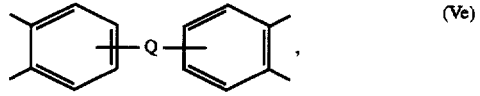
(Vd)

(Ve)

(Vf)

(Vg)

(Vh)

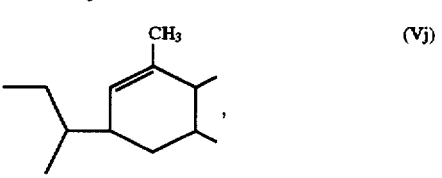
(Vi)

(Vj)

wherein Q is —$CH_2$—, —$CH(CH_3)$—, —$C(CH_3)_2$—, —$C(CF_3)_2$—, —S—, —O—, —$SO_2$—, —NHCO—, —CO— or >P(O)($C_1$–$C_{20}$alkyl), and wherein the aromatic rings in the formulae and (Va)–(Ve) are unsubstituted or substituted by one or more $C_1$–$C_6$alkyl groups, $C_1$–$C_6$alkoxy groups or halogen atoms.

4. A process according to claim 1, wherein the sterically hindered hydroxyphenylalkylphosphonic acid ester or half-ester corresponds to the formula:

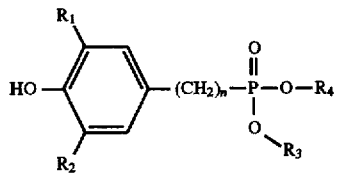
(II)

wherein $R_1$ is isopropyl, tert-butyl, cyclohexyl or cyclohexyl which is substituted by 1 to 3 $C_1$–$C_4$alkyl groups;

$R_2$ is H, $C_1$–$C_4$alkyl, cyclohexyl or cyclohexyl which substituted by 1 to 3 $C_1$–$C_4$alkyl groups;

$R_3$ is $C_1$–$C_{20}$alkyl or substituted or unsubstituted phenyl or naphthyl;

$R_4$ is H, $M^{2+}/2$, $C_1$–$C_{20}$alkyl or substituted or unsubstituted phenyl or naphthyl;

$M^{2+}$ is a divalent metal cation, and n is 1 to 6.

5. A process according to claim 1, wherein the sterically hindered hydroxyphenylalkylphosphonic acid ester or half-ester is a compound of formula:

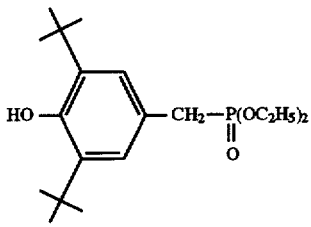

or

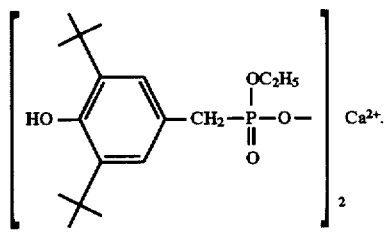

6. A process according to claim 1, which comprises using a metal salt of the sterically hindered hydroxyphenylalkylphosphonic acid ester in admixture with a polyethylene wax.

7. A process according to claim 1, which comprises using 0.01 part to 5 parts of the tetracarboxylic dianhydride and 0.01 part to 5 parts of the sterically hindered hydroxyphenylalkylphosphonic acid ester or half-ester per 100 parts of polyester.

8. A polyester comprising a tetracarboxylic dianhydride and a sterically hindered hydroxyphenylalkylphosphonic acid ester or half-ester.

9. A polyester recyclate comprising a tetracarboxylic dianhydride and a sterically hindered hydroxyphenylalkylphosphonic acid ester or half-ester.

10. A PET or PBT recyclate comprising a tetracarboxylic dianhydride and a sterically hindered hydroxyphenylalkylphosphonic acid ester or half-ester.

11. A polyester obtained by a process as claimed in claim 1.

* * * * *